United States Patent [19]

Keller

[11] Patent Number: 4,924,582

[45] Date of Patent: May 15, 1990

[54] DOOR HANDLE ASSEMBLY METHOD

[75] Inventor: John F. Keller, Troy, Mich.

[73] Assignee: Saturn Corporation, Troy, Mich.

[21] Appl. No.: 314,680

[22] Filed: Feb. 23, 1989

Related U.S. Application Data

[62] Division of Ser. No. 138,566, Dec. 28, 1987, Pat. No. 4,834,433.

[51] Int. Cl.[5] .......................... B23P 11/00; E05C 3/26

[52] U.S. Cl. ................................ 29/434; 16/DIG. 24

[58] Field of Search ............... 29/434; 16/112, 114 R, 16/DIG. 24; 292/336.3, 347, 352, DIG. 31, DIG. 37

[56] References Cited

U.S. PATENT DOCUMENTS 3,967,844 6/1976 Torli et al. .
4,232,892 11/1980 Kuki .
4,475,415 10/1980 Yamamoto .
4,478,445 10/1984 Shimixu .
4,591,196 5/1986 Kurita .
4,634,161 1/1987 Fukasawa et al. .

*Primary Examiner*—Timothy V. Eley
*Attorney, Agent, or Firm*—Charles E. Leahy

[57] ABSTRACT

The support member underlying the door outer panel has coaxially aligned apertures formed in spaced apart walls thereof. First and second telescopically engaged axle members molded of plastic have integral axle spindles projecting from the ends thereof. A spring acts between the axle members to permit axial contraction of the axle members relative one another so that the axle spindles may be inserted between the spaced apart aperture panel walls. The spring then functions to extend the axle members axially apart to position the axle spindles within the panel apertures and thereby rotatably mount the axle members on the panel. A plastic handle has integrally molded snap fastener features adjacent the ends thereof which respectively snap fit into integral fasteners provided respectively on the first and second axle members to effectively retain the axle members at their axially apart positions so that the handle functions to retain the axle members at their axially apart positions and positively retain the axle spindles in the panel apertures. The handle is assembled by first mounting the axle members on the support panel, then installing the outer panel on the door, then attaching the handle to the axle members.

2 Claims, 2 Drawing Sheets

DOOR HANDLE ASSEMBLY METHOD

This is a division of application Ser. No. 138,566 filed on Dec. 28, 1987 now Pat. No. 4,834,433.

The invention relates to a door handle assembly for a motor vehicle and more particularly provides a door handle assembly comprised of molded plastic parts which snap together to eliminate the need for separate fasteners.

BACKGROUND OF THE INVENTION

It is well known in motor vehicles to provide a door hinged for movement between open and closed positions. A latch is provided to latch the door in a closed position. A door handle is provided on the outside of the door to enable unlatching of the door and movement of the door to the open position.

Door handle assemblies traditionally include a handle which is pivotally mounted in a depression on the outside of the door. The handle is lifted or pulled to rotate the handle and thereby operate a rod connected to the door latch. The handle commonly has projections adjacent its ends which are pivotally mounted on a mounting bracket by rivets or other suitable pins or fasteners to provide a pivot axis for the handle. The mounting bracket is in turn riveted or otherwise attached to the door outer panel. A spring acts between the handle and the mounting bracket to pivot the handle to a normal position.

It would be desirable to provide a door handle assembly which would eliminate the need for separate fasteners or pins providing the pivot axis for the door handle. Furthermore, it would be desirable to provide a door handle in which the door handle were pivoted directly upon the door structure thereby eliminating the need for a separate mounting bracket. It would also be desirable to provide a door handle comprised of plastic parts which snap together and eliminate the need for separate fasteners. In addition it would be desirable that the door handle be pivotally mounted on the door reinforcement member underlying the door outer panel, particularly in those vehicles in which the door outer panel is constructed of plastic.

Furthermore, it would be desirable to provide a door handle assembly in which the handle may be assembled from outside the vehicle after the door outer panel is attached to the door.

SUMMARY OF THE INVENTION

According to the invention the door panel or other structural member of the door has coaxially aligned apertures formed in spaced apart walls thereof. First and second telescopically engaged axle members molded of plastic have integral axle spindles projecting from the ends thereof. A spring acts between the axle members to permit axial contraction of the axle members relative one another so that the axle spindles may be inserted between the spaced apart aperture panel walls. The spring then functions to extend the axle members axially apart to position the axle spindles within the panel apertures and thereby rotatably mount the axle members on the panel. A plastic handle has integrally molded snap fastener features adjacent the ends thereof which respectively snap fit into integral fasteners provided respectively on the first and second axle members to effectively retain the axle members at their axially apart positions so that the handle functions to retain the axle members at their axially apart positions and positively retain the axle spindles in the panel apertures. The spring acting between the first and second axle members is a coil compression spring acting to extend the axle members and also has one end anchored on one of the axle members and the other end engaging the door panel to bias the handle to its normal rotary position.

The door handle assembly is mounted on the door by mounting the axle members upon the support panel before the door outer panel is mounted on the door. Extension portions provided on the axle members reach through a pair of apertures in the door outer panel. After the outer panel is mounted on the door, the panel handle is snapped onto the extensions.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
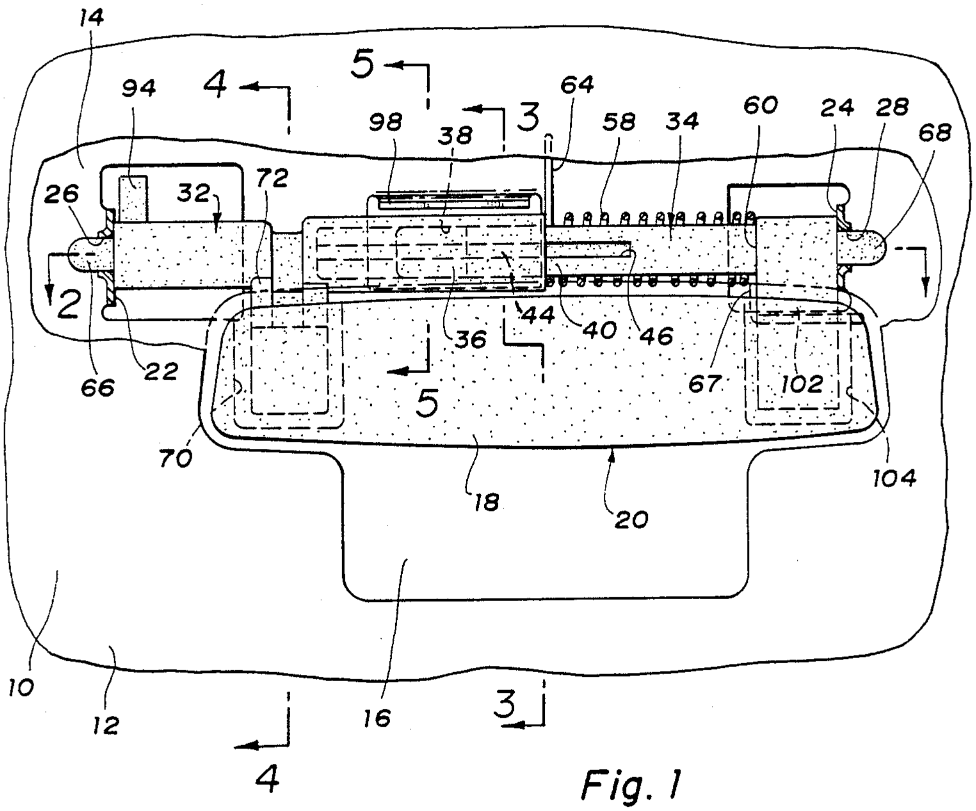
FIG. 1 is a frontal elevation view of a door handle assembly according to the invention and has parts broken away and in section.

FIG. 1 shows a fragmentary view of a vehicle door 10 having an outer panel 12 and an inner support panel 14 which acts as a load bearing reinforcement. The outer panel 12 may be a plastic or metal panel and has a depression 16 in which a door handle 18 of a door handle assembly 20 is mounted to be flush with the outer panel 12.

Figure 2:
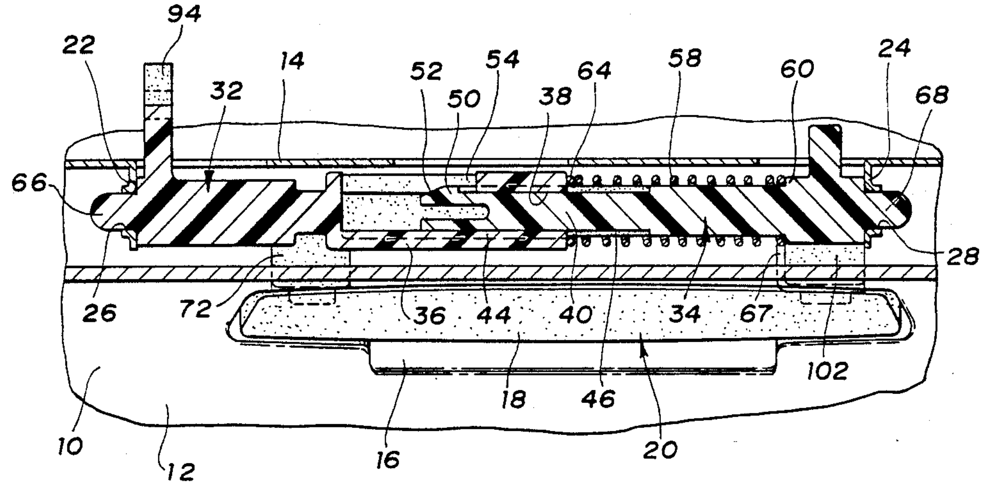
FIG. 2 is a sectional view taken in the direction of arrows 2—2 of FIG. 1.

As best seen in FIGS. 1 and 2, the inner support panel 14 is a sheet metal stamping and has tabs or walls 22 and 24 struck therefrom to project normally from the inner support panel 14. The tabs 22 and 24 each have an extruded circular aperture therethrough. As seen in FIGS. 1 and 2, the extruded aperture 26 of the tab 22 is coaxially aligned with the extruded aperture 28 of the tab 24. The extruded apertures 26 and 28 define integral bearing surfaces.

Figure 5:
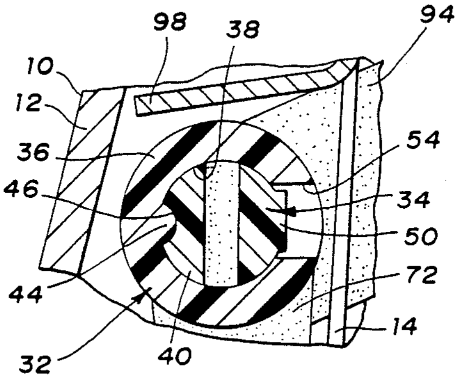
FIG. 5 is a sectional view taken in the direction of arrows 5—5 of FIG. 1.

The door handle assembly 20 includes a pair of molded plastic axle members 32 and 34 which are telescopically interfit together. As best seen in FIGS. 1, 2 and 5, the axle member 32 has a circular cylindrical sleeve 36 having a central bore 38. The axle member 34 has a shaft 40 which slip fits into the bore 38 of axle member 32. As best seen in FIG. 5, the axle member 32 has a spline 44 which projects radially into the bore 38 and fits into a mating groove 46 in the shaft 40 of axle member 34 so that the axle members 32 and 34 are splined together for unitary rotation. As best seen in FIGS. 2 and 5, the shaft portion 40 has an integrally molded snap tab 50 including a ramp 52 on the nose thereof. When the shaft 40 of axle member 34 is inserted into the bore 38, the ramp 52 causes the integral snap tab 50 to yield radially inward to permit the insertion of the shaft 40 into the bore 38. When the axle member 34 is fully inserted, the integral snap finger 50 returns radially outward and fits within a slot 54 in the sleeve 36 to retain the axle member 34 in telescoping relationship with the axle member 32.

As seen in FIGS. 1 and 2, a coil compression spring 58 encircles the axle member 34 and has one end seated against a shoulder 60 of the axle member 34 and the opposite end seated against the end of the sleeve 36 of axle member 32. As best seen in FIG. 1, the lefthand end coil 64 of spring 58 projects laterally outward and seats against the support panel 14. The righthand end coil 67 of the spring 58 extends laterally outward and seats on the axle member 34. Accordingly, the spring 58 acts to urge and extend the axle members 32 and 34 axially apart from one another, and also acts to urge the axle members to a normal rotary position of FIGS. 1 and 2 relative to the inner support panel 14.

The axle member 32 has an integrally molded axle spindle 66 which projects through the extruded aperture 26 of the support panel tab 22 and the axle member 34 has a integrally molded axle spindle 68 which extends through the extruded aperture 28 of the support panel tab 24. Accordingly, the axle spindles 66 and 68 serve to rotatably mount the axle members on the inner support panel 14.

Figure 4:
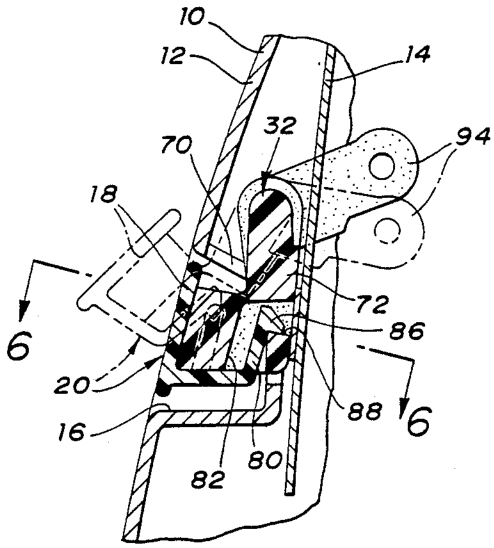
FIG. 4 is a sectional view taken in the direction of arrows 4—4 of FIG. 1.
Figure 6:
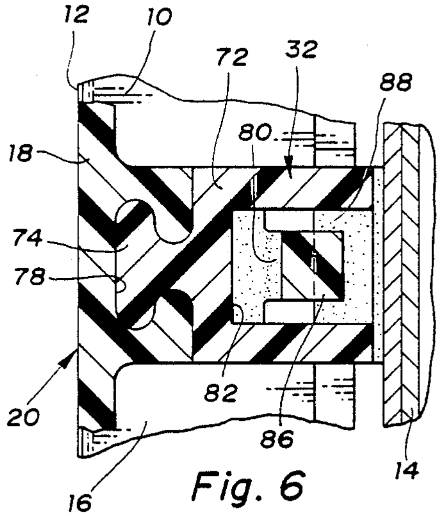
FIG. 6 is a sectional view taken in the direction of arrows 6—6 of FIG. 4.

FIGS. 4 and 6 show the attachment of the handle 18 to the axle members 32 and 34. As best seen in FIG. 4, the outer panel 12 has an aperture 70. The axle member 32 has an lateral extension 72 which reaches through the aperture 70 in the depression 16 of the outer panel 12. As seen in FIG. 6, this lateral extension 72 has a T-shaped head 74 which extends generally vertically. The handle 18 has an integrally molded T-shaped slot 78 by which the handle 18 may be slip fitted onto the T-shaped head 74 of the axle member 32. In addition, the handle 18 has an integrally molded snap fastener 80 which snaps into a receptacle 82 defined in the lateral extension 72. As best seen in FIG. 4, the snap fastener 80 includes a hook 86 which snaps over an abutment 88 of the lateral extension 72 so that the handle 18 has retained upon the lateral extension 72. As best seen in FIG. 6, the T-shaped head 74 of the lateral extension 72, the T-shaped groove 78 of the handle, and the snap tab 80 are oriented for installation in a direction normal to the direction in which the handle is pulled so that the effort applied to the handle during normal unlatching of the latch is prevented from acting in a direction to unsnap the handle from the axle members.

Figure 3:
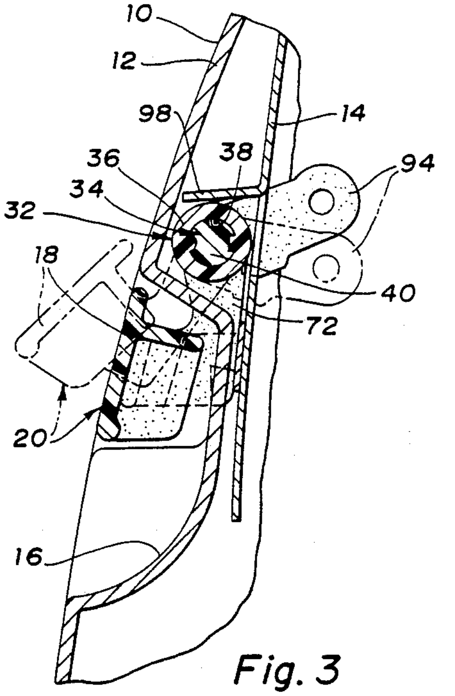
FIG. 3 is a sectional view taken in the direction of arrows 3—3 of FIG. 1.

As best seen in FIGS. 2, 3 and 4, the axle member 32 has an inwardly offset arm 94 which is connected to the door latch by an operating rod, not shown, so that rotary lifting movement of the handle 18 from the solid line indicated positions of FIGS. 3 and 4 to the phantom indicated positions of FIGS. 3 and 4 will unlatch the door for opening movement.

As best seen in FIGS. 1, 3 and 5, a tab 98 is struck from the support panel 14 and overlies the sleeve 36 of axle member 32. Accordingly, if the vehicle user overstresses the handle assembly 20 and thereby causes the plastic axle members 32 and 34 to be yielded upwardly, such upward yielding movement will be limited by engagement of the sleeve 36 with the tab 98 to thereby prevent excessive overstressing of the plastic parts.

Referring again to FIGS. 1 and 2, it is seen that the axle member 34 has a lateral extension 102 similar to the lateral extension 72 of the axle 32. It will be understood that this lateral extension 102 reaches through an aperture 104 in outer panel 12 and is coupled with the handle 18 by a snap fastener structure like the structure shown in FIGS. 4 and 6 and described hereinbefore.

The aforedescribed molded plastic door handle construction provides several advantages in the manufacture and assembly thereof.

The tabs 22 and 24 and their extruded apertures 26 and 28 are formed in the support panel 14 without any added operations to the conventional sheet metal stamping of the support panel 14. The door handle assembly 20 is comprised of only four component parts, that is, the injection molded plastic axle member 32, the injection molded axle member 34, the injection molded handle 18, and the coil spring 58.

During assembly, the coil spring 58 is installed on the axle member 34 which is then inserted into the sleeve 36 of axle member 32. The snap fastener 50 serves to retain the axle members 32 and 34 in their telescoping relationship even though the spring 58 acts to axially separate the axle members. The axle members are installed in the vehicle door by the assembly worker simply axially contracting the axle members 32 and 34 as permitted by yielding of the spring 58 and then allowing the axle members 32 and 34 to extend relative each other while holding the axle spindles 66 and 68 in alignment with the extruded apertures 26 and 28.

Later, the outer panel 12 is mounted on the door with the lateral extensions 72 and 102 of the axle members reaching through the apertures 70 and 104 of the outer panel 12. After the outer panel is installed, the handle 18 is installed from outside the door onto the lateral extension 72 of the axle member 32 and the lateral extension 102 of the axle member 34. The handle 18 bridges between the axle members 32 and 34 and functions to positively maintain the axle members 32 and 34 at their axially extended positions thereby assuring against inadvertent disassembly of the door handle.

Thus it is seen that the invention provides a new and improved door handle assembly comprised of a minimum number of component parts and in which the fastening elements are provided integral with such plastic molded parts. Furthermore the handle is pivoted on the support panel 14 underlying the outer panel 12 and the handle is assembled after the door outer panel is mounted on the door.

I claim:

1. Method of installing a door handle having an axially contractible axle with axle ends on a vehicle door having a support panel underlying a door outer panel, said support panel having spaced apart coaxially arranged aperture means provided therein, comprising:

pivotally mounting the axle upon the support panel by positioning the ends of the axle in the aperture means of the support panel, said axle having integral attachment means thereon adapted to attach a handle thereto;

installing the door outer panel, said door outer panel having door panel aperture means therein overlying the integral attachment means of the axle, and mounting the door handle on the vehicle door subsequent to the installing of the door outer panel, said door handle having integral attachment means cooperating with the attachment means of the axle to reach through the door panel aperture means and attach the door handle on the axle.

2. Method of installing a door handle having an axially contractible axle with axle ends on a vehicle door having a support panel underlying a door outer panel, said support panel having spaced apart coaxially arranged apertures means provided in therein, comprising, pivotally mounting the ends of the axially contractible axle upon the support panel by contracting the axle, positioning the ends of the axle coaxially with the aperture means of the support panel means, and axially extending the axle from the contracted condition, said axle having integral attachment means thereon adapted to attach a handle thereto, installing the door outer panel upon the door, said door outer panel having door panel aperture means therein overlying the integral attachment means of the axle, and mounting the door handle on the vehicle door subsequent to the installing of the door outer panel, said door handle having integral attachment means cooperating with the attachment means of the axle to reach through the door panel aperture means and attach the door on the axle so that the axle mounts the door handle for rotary movement to operate the door latch.

* * * * *